(12) United States Patent
Liu et al.

(10) Patent No.: US 7,440,546 B2
(45) Date of Patent: Oct. 21, 2008

(54) METHOD OF MAKING AND STRUCTURE OF MULTILAYER LAUE LENS FOR FOCUSING HARD X-RAYS

(75) Inventors: Chian Q. Liu, Bolingbrook, IL (US); Raymond P. Conley, DeKalb, IL (US); Albert T. Macrander, Naperville, IL (US); Hyon Chol Kang, Chonan Chungchongnam-Do (KR); G. Brian Stephenson, Lisle, IL (US); Jorg Maser, Oak Park, IL (US)

(73) Assignee: UChicago Argonne, LLC, Chicago, IL (US)

( * ) Notice: Subject to any disclaimer, the term of this patent is extended or adjusted under 35 U.S.C. 154(b) by 43 days.

(21) Appl. No.: 11/634,681

(22) Filed: Dec. 6, 2006

(65) Prior Publication Data

US 2008/0137810 A1 Jun. 12, 2008

(51) Int. Cl.
*G21K 1/06* (2006.01)
(52) U.S. Cl. ............................................. 378/85; 378/84
(58) Field of Classification Search ................ 378/84, 378/85, 145
See application file for complete search history.

(56) References Cited

U.S. PATENT DOCUMENTS 5,604,782 A * 2/1997 Cash, Jr. ...................... 378/85

OTHER PUBLICATIONS

Liu et al., "Depth-graded multilayers for application in transmission geometry as linear zone plates", Journal of Applied Physics, vol. 98, Issue 11, Dec. 13, 2005, pp. 113519-1 through 113519-6.*
Windt et al., "X-ray multilayer coatings for use at energies above 100 keV", Proceedings of SPIE, vol. 4012, Jul. 2000, pp. 442-447.*
Multilayer Laue Lenses as High-Resolution X-ray Optics, by J. Maser et al., Proc. SPIE 5539, 194, 2004.
2005 R&D 100 Award Entry Multilayer Lens Wafers for X-Ray Lenses, by Chian Liu et al., Argonne National Laboratory.

* cited by examiner

*Primary Examiner*—Chih-Cheng G Kao
(74) *Attorney, Agent, or Firm*—Joan Pennington (57) ABSTRACT

A zone plate multilayer structure includes a substrate carrying a plurality of alternating layers respectively formed of tungsten silicide ($WSi_2$) and silicon (Si). The alternating layers are sequentially deposited precisely controlling a thickness of each layer from a minimum thickness of a first deposited layer adjacent the substrate to a maximum thickness of a last deposited layer. The first minimum thickness layer has a selected thickness of less than or equal to 5 nm with the thickness of the alternating layers monotonically increasing to provide a zone plate multilayer structure having a thickness of greater than 12 μm (microns). The x-rays are diffracted in Laue transmission geometry by the specific arrangement of silicon and tungsten silicide.

17 Claims, 7 Drawing Sheets

USE TWO PARTIAL LINEAR ZONE PLATES, TILTING AT AN OPTIMUM ANGLE FOR HIGH DIFFRACTION EFFICIENCY, AND CROSS THE TILTED PARTIAL LINEAR ZONE PLATE PAIR PERPENDICULARLY TO PRODUCE A PARTIAL MULTILAYER LAUE LENS AND FOCUS X-RAYS TO A POINT.
220

FIG. 2C

USE FOUR PARTIAL LINEAR ZONE PLATES MECHANICALLY HELD AND ALIGNED FOR PROVIDING A FULL MULTILAYER LAUE LENS. (A TWO PARTIAL ZONE PLATE PAIR FOCUSES X-RAYS TO A LINE AND THE TWO PAIRS CROSSED FOCUS THE X-RAYS TO A POINT.)
230

FIG. 2D

BOND TOGETHER TWO ZONE PLATE MULTILAYER STRUCTURES FACE TO FACE WITH THICKEST LAYERS NEAR THE BONDING LAYER (BONDING AGENT GOLD-TIN MIXTURE, HEAT IN VACUUM OVEN, E.G. 280-300 DEG C, FOR SET TIME PERIOD)
240

SLICE THE BONDED MULTILAYER INTO MULTIPLE IDENTICAL SECTIONS AND POLISH THE MULTIPLE SECTIONS TO A SELECTED DEPTH TO PRODUCE MULTIPLE FULL LINEAR ZONE PLATES TO FOCUS X-RAYS TO A LINE. CONTROL THE DEGREE OF NATURAL BENDING OF EACH POLISHED FULL LINEAR ZONE PLATE TO ENHANCE THE DIFFRACTION EFFICIENCY.
242

USE TWO BONDED FULL LINEAR ZONE PLATES CROSSED TO PRODUCE A FULL MULTILAYER LAUE LENS TO FOCUS X-RAYS TO A POINT.
244

METHOD OF MAKING AND STRUCTURE OF MULTILAYER LAUE LENS FOR FOCUSING HARD X-RAYS

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an improved apparatus and method of making the apparatus for sharper focusing of hard x-rays; and more specifically, relates to a Multilayer Laue Lens (MLL) zone plate for focusing of hard x-rays and a method of making the MLL zone plate.

DESCRIPTION OF THE RELATED ART

Modern synchrotron-radiation facilities provide unprecedented levels of intensity and collimation in x-ray beams and offer tremendous research opportunities. The development of improved x-ray focusing optics is essential for further advances in x-ray microimaging and microanalysis applications.

Focusing optics for x-rays differ from those for visible light, as the refractive index of solids is slightly smaller than unity for x-rays and significantly greater than unity for visible light. Reflective x-ray mirrors, such as elliptical Kirkpatrick-Baez (KB) mirrors and tapered hollow capillaries, can be used only at very small grazing angles below the critical angle of the reflecting material.

Refractive lenses for x-rays have the opposite curvature to that for visible light. A solid focusing lens for visible light corresponds to a cavity with the same shape for x-rays. Since the refractive index is very close to one, a series of concave lenses is needed to give a reasonable focal length for x-rays. This kind of refractive lens, using materials of low absorption, has been used to focus x-rays. While submicron x-ray spots have been achieved with reflective and refractive optics, the smallest x-ray focal spots obtained were produced using Fresnel zone plates. Spatial resolution on the order of 20 nm in the soft-x-ray range has been reported.

Fresnel zone-plate lenses are diffractive optics. Traditional zone plates are circular transmission gratings consisting of alternating transparent and opaque (or phase-shifting) rings. Each ring (or zone) is positioned so that the optical path from the zone plate to the primary focus differs by $\lambda/2$ between consecutive zones, where $\lambda$ is the x-ray wavelength. X-rays diffracted by the zones thus add "in phase" at the primary focus. The optimum zone positions are given by the Fresnel zone-plate formula, $$r_n^2 = n\lambda f + n^2\lambda^2/4, \qquad (1)$$

Where $r_n$ is the radius of the nth zone, and f is the focal length. The second term in Eq. (1) is a correction for spherical aberration and can be omitted when $n\lambda << f$. The width of the nth zone is $(r_n - r_{n-1})$. The focusing capability of a zone plate depends on the width of the outermost zone, the optical contrast between the alternating zones, and the accuracy of the zone placement. Both transmission- and reflection-geometry zone plates have been developed. For optimized x-ray zone plates, depths of several microns are typically required for efficient focusing of hard x-rays.

Traditional Fresnel zone plates have been used extensively to build x-ray microscopes for soft x-rays. For example, such a microscope is available from Xradia Inc. of Concord, Calif.

A major effort in the field of x-ray nanoprobes and microscopes is to achieve efficient, high-spatial-resolution focused x-ray beams. Several approaches have been explored using traditional zone plates, refractive lenses, Kirkpatrick-Baez (KB) mirrors, and channel waveguides combined with KB mirrors, which have pushed the spatial resolution below the 100-nm level.

Traditional zone plates are fabricated using lithographic techniques with metal electroplating on silicon nitride membranes. For efficient focusing of hard x-rays, a very large aspect ratio is required, which presents a formidable challenge for the manufacturing process. To achieve a high aspect ratio of zone depth to width, a mask with the zone-plate pattern is first made using e-beam lithography, and x-ray lithography is then used with a thick resist and subsequent metal electroplating on silicon nitride membranes for zone-plate fabrication. Tremendous progress has been made in this field, and very recently a spatial resolution of 60 nm was achieved for 8 keV hard x-rays using zone plates with a 50 nm outermost zone width and 1 µm zone depth with gold as the zone material. However, as the desired zone width becomes smaller and zone depth larger, the manufacturing process becomes increasingly difficult.

A principal aspect of the present invention is to provide a Multilayer Laue Lens (MLL) zone plate for effectively focusing hard x-rays and a method of making the MLL.

Another aspect of the present invention is to provide such Multilayer Laue Lens (MLL) zone plate enabling a fine zone width and a large aspect ratio for effectively focusing hard x-rays.

Other important aspects of the present invention are to provide such Multilayer Laue Lens (MLL) zone plate and a method of making the MLL zone plate substantially without negative effect and that overcome some of the disadvantages of prior art arrangements of traditional zone plate.

SUMMARY OF THE INVENTION

In brief, a zone plate multilayer structure and method of making a Multilayer Laue Lens (MLL) for focusing hard x-rays are provided. The zone plate multilayer structure includes a substrate carrying a plurality of alternating layers respectively formed of tungsten silicide ($WSi_2$) and silicon (Si). The alternating layers are sequentially deposited precisely controlling the thickness of each layer from a minimum thickness of a first deposited layer adjacent the substrate to a maximum thickness of a last deposited layer. The first minimum thickness layer has a selected thickness of less than or equal to 5 nm with the thickness of the alternating layers monotonically increasing to provide a zone plate multilayer structure having a thickness of greater than 12 µm (microns).

The multilayer structure is sliced and polished to many sections with desired dimensions. Each section can be used as a partial linear zone plate to focus hard x-rays to a line. The x-rays are diffracted in Laue transmission geometry by the specific arrangement of silicon and tungsten silicide. Two such sections crossed focus the x-rays to a point. The sections are tilted at an optimum angle for high diffraction efficiency. For example, highest efficiency is achieved with the layers in the multilayer sections are tilted towards the Bragg angle of diffraction. Ideally, four such sections can be used to form a complete MLL. A two-section pair focuses the x-rays to a line and two pairs crossed focus the x-rays to a point. Substantial mechanical design is needed to hold and align the sections. Alternatively, two multilayer structures are bonded together face to face so that the thickest layers are near the bonding layer. They are then sliced and polished to a desired dimension to form a full linear zone plate to focus the x-rays to a line. Two such linear zone plates crossed form a complete MLL to focus the x-rays to a point.

In accordance with features of the invention, the thickness of each layer is precisely controlled, for example, in a range of less than three angstroms. Sputtering, such as, direct current (DC) magnetron sputter deposition forms the layers. For example, the plurality of alternating tungsten silicide ($WSi_2$) and silicon (Si) layers is formed on a substrate that is sliced and polished to form many substantially identical multilayer sections. These sections have a selected depth to form partial linear zone plates with a large aspect ratio.

In accordance with features of the invention, two multilayers are bonded together face to face to form the full linear zone plate after slicing and polishing, for example, using a sputter-coated gold-tin mixture as a bonding agent and heating in a vacuum oven at a selected temperature for a set time period. For example, the selected temperature is provided in a range between 280 and 300 degrees C. The thickness of the sputter-coated gold-tin layer is precisely controlled so that each layer in the multilayer is placed accurately as required.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, fabrication of linear zone plates is achieved using sputtered-sliced planar multilayers made of selected materials. The fabrication of zone plates by alternative techniques of the invention surmounts some prior art limitations. A growth of a multilayer film to be used in transmission or Laue diffraction geometry is provided, in which the thickness of consecutive layers gradually increases according to the Fresnel zone formula. The film is sectioned after growth to the required depth. For a planar multilayer, this produces a linear zone plate that can focus x-rays substantially in one dimension.

In accordance with features of the invention, a method of making a Multilayer Laue Lens (MLL) zone plate includes the deposition and sectioning of a multilayer consisting of high-Z and low-Z layers, where Z is the electron density. The thickness of deposited films can be controlled in the Angstrom range much more precisely than the x-y positioning in a lithographic system. With slicing and polishing, large aspect ratios can easily be obtained.

In accordance with features of the invention, it has been determined that $WSi_2$/Si is the selected good multilayer system because of its excellent mechanical and thermal properties and sharp interfaces. Thick zone-plate multilayers (>10 μm) have been grown without cracking or peeling. A partial zone-plate multilayer structure of 8 μm with p=0.27 and $\Delta r_{min}$=15 nm has produced a 72.7-nm line focus for 19.5-keV x rays, where p is the fraction number of the partial structure relative to the full zone plate structure. Techniques of the invention are provided to perfect the multilayer growing process and related thin-film growth issues for a structure of 12.43 μm with $\Delta r_{min}$=10 nm.

In accordance with features of the invention, a multilayer structure of 728 alternating $WSi_2$ and Si layers with thicknesses gradually increasing from 10 to ~58 nm according to the Fresnel zone-plate formula has been fabricated using dc magnetron sputtering. This structure was analyzed with a scanning electron microscope (SEM) and tested with 19.5-keV synchrotron x-rays after sectioning and polishing. Line focus sizes as small as 30.6 nm have been achieved using a sectioned multilayer in transmission diffraction geometry.

In accordance with features of the invention, another multilayer structure of 1588 alternating $WSi_2$ and Si layers with thicknesses gradually increasing from 5 to ~25 nm according to the Fresnel zone-plate formula for a total thickness of approximately 13.25 μm has been fabricated using DC magnetron sputtering. This structure was analyzed with a scanning electron microscope (SEM) and tested with 19.5-keV synchrotron x-rays after sectioning and polishing. Line focus sizes as small as 17 nm have been achieved.

In accordance with features of the invention, a Multilayer Laue Lens (MLL) zone plate advantageously is used for focusing x-rays in the 5 to 100 KeV range, and can be used long term, whereas conventional devices used in the 5 to 24 KeV range typically show signs of deterioration after only several weeks of use.

In accordance with features of the invention, two partial multilayer linear zone plates aligned in series perpendicularly can be used to form a partial Multilayer Laue Lens to focus the x-rays to a point.

In accordance with features of the invention, with sophisticated mechanical design to hold and align the partial linear zone plates, four partial multilayer linear zone plates can be used to form a complete Multilayer Laue Lens to focus the x-rays to a point.

In accordance with features of the invention, by using a metallic bonding technique detailed in this invention, two zone-plate multilayer structures can be bonded together face to face with precision to keep the zone positions that are required for a zone plate. Two sliced and polished bonded zone-plate multilayer structures aligned in series perpendicularly can be used to form a complete Multilayer Laue Lens to focus the x-rays to a point.

Figure 1:
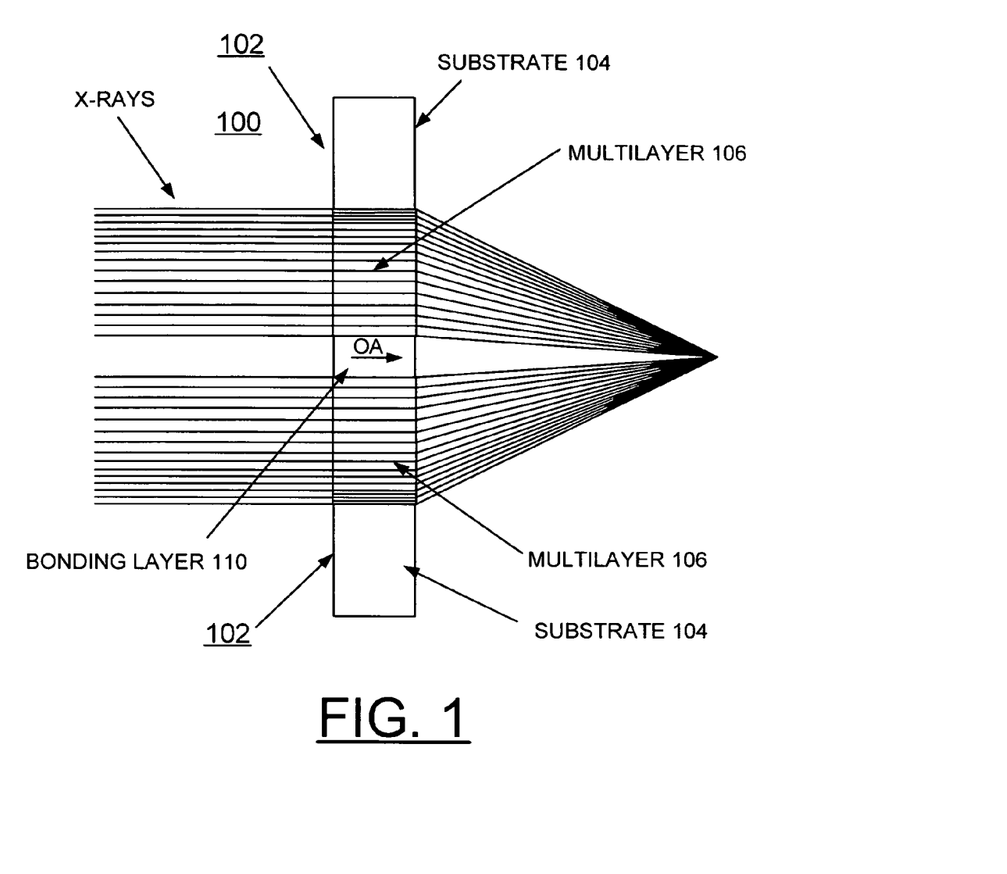
FIG. 1 illustrates an exemplary Multilayer Laue Lens (MLL) linear zone plate in accordance with the preferred embodiment.

Having reference now to the drawings, in FIG. 1 there is shown an exemplary Multilayer Laue Lens (MLL) in accordance with the preferred embodiment and generally designated by the reference numeral 100.

The Multilayer Laue Lens (MLL) zone plate 100 is a multilayer device for focusing hard x-rays. The Multilayer Laue Lens (MLL) zone plate 100 is based on x-ray diffraction and obeys the zone-plate law as a traditional zone-plate while having a different shape and fabrication method. The Multilayer Laue Lens (MLL) zone plate 100 of the invention is robust, and does not crack while prior known construction methods have resulted in fragile layers that would crack and fail.

The Multilayer Laue Lens (MLL) zone plate 100 includes a first section 102 and a second section 102. The first and second sections 102 are substantially identical. Each section 102 includes a substrate 104 carrying a multilayer 106 of a plurality of alternating layers respectively formed of tungsten silicide ($WSi_2$) and silicon (Si). The alternating layers of multilayer 106 have an increasing thickness from a minimum thickness adjacent the substrate 104 and a maximum thickness near the bonded portion 110 nearest to an optical axis (OA) of the MLL zone plate 100 indicated by an arrow labeled OA. The x-rays are diffracted in Laue transmission geometry by the specific arrangement of silicon and tungsten silicide.

As illustrated in FIG. 1, two substantially identical planar multilayer sections 102 fabricated using sputtered-sliced multilayers grown on flat Si substrates are assembled to form the two halves of the MLL linear zone plate 100, to produce a focus in one dimension. The separation of the two halves without a bonding layer allows the multilayer sections 102 to be tilted at the optimum angle (typically ~0.1 degree according to our experiments) for high diffraction efficiency. With a bonding layer the two halves cannot be tilted independently. The natural bending for the thin polished bonded halves can help to enhance the diffraction efficiency. Another pair of multilayer sections 102 rotated by 90° about the optical axis advantageously can be used to produce a point focus.

This new type of linear zone plate is called a Multilayer Laue Lens (MLL) zone plate 100. The MLL zone plate or structure 100 is defined by the Fresnel zone-plate formula $$r_n^2 = n\lambda f + n^2 \lambda^2/4 \qquad \text{Eq. (1),}$$

where $\lambda$ is the x-ray wavelength, f is the focal length, and $r_n$ is the layer position of the nth zone. The second term can be omitted when $n\lambda \ll f$, leading to a d-spacing of $d(r_n) \equiv (r_n - r_{n-2}) \approx f\lambda/r_n$. A plot of $1/d(r_n)$ versus $r_n$ is then a straight line with a slope of $1/f\lambda$ related to the focal length. The resolution limit for an ideal full MLL equals the outermost zone width $\Delta r_{min}$. For a partial structure, the resolution becomes $\Delta r_{min}/p$, where p is the fraction number of the partial structure. To achieve a nanofocus, one needs an unprecedented multilayer with thousands of layers and precise layer thickness correlations. It has been determined by the present inventors that $WSi_2/Si$ is the multilayer system to achieve this goal. Since the multilayer sections 102 are assembled with the substrate side 104 oriented away from the optical axis OA, the thinnest zones of multilayer 106 are grown first, minimizing the impact of accumulated growth imperfections on zone-plate performance.

The fabrication of the MLL linear zone plate 100 achieves three major challenges to growing the linear zone-plate multilayer structures. First, MLL linear zone plate 100 including alternating layers of tungsten silicide ($WSi_2$) and silicon (Si) has both low stress and good adhesion to survive the subsequent cutting and polishing. Second, the growth process of the alternating layers of tungsten silicide ($WSi_2$) and silicon (Si) enables each zone layer to be precisely placed. Third, automatically performing prolonged deposition according to the zone-plate formula and with growth-rate correction for each layer advantageously is provided in accordance with the preferred embodiment.

Referring to FIGS. 2A, 2B, 2C and 2D, there are shown exemplary steps for making three kinds of Multilayer Laue Lens (MLL) zone plates in accordance with the preferred embodiment starting with a planar silicon (Si) substrate, such as a flat super polished Si substrate as indicated in a block 202. A first layer of tungsten silicide ($WSi_2$) with a minimum thickness, such as 5 nm is deposited by magnetron sputtering as indicated in a block 204. A next layer of silicon Si also having a minimum thickness, such as 5 nm is deposited by magnetron sputtering as indicated in a block 206. Controlled depositing of alternating layers of tungsten silicide ($WSi_2$) and silicon (Si) layers with gradually increasing thickness is provided as indicated in a block 208. The thickness of each layer is precisely controlled, for example, in a range of less than three angstroms. Sputtering, such as, direct current (DC) magnetron sputter deposition forms the layers, to provide a total thickness of 13.25 microns with a maximum layer thickness of ~25 nm at block 208.

Figure 2A:
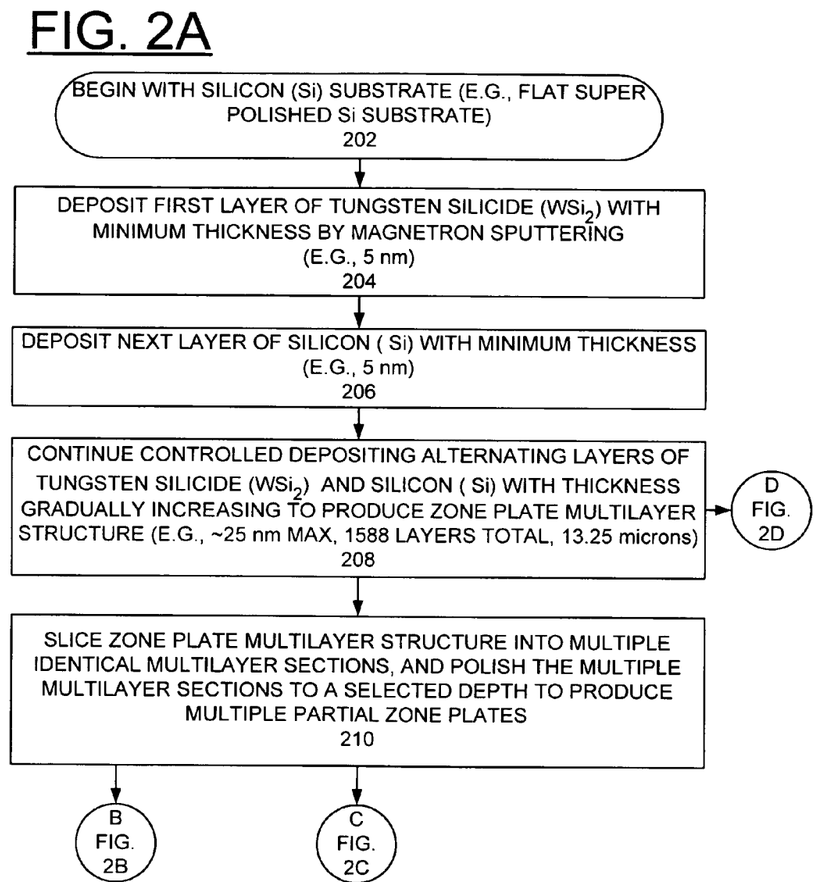
FIGS. 2A, 2B, 2C and 2D are flow charts illustrating exemplary steps for making three kinds of Multilayer Laue Lens (MLL) zone plates in accordance with the preferred embodiment.

Then as indicated in a block 210, for example, the plurality of alternating tungsten silicide ($WSi_2$) and silicon (Si) layers being formed on a substrate is sliced to form multiple identical multilayer sections. The multilayer sections are then polished to a selected depth to form multiple partial linear zone plates with a large aspect ratio.

Figure 2B:
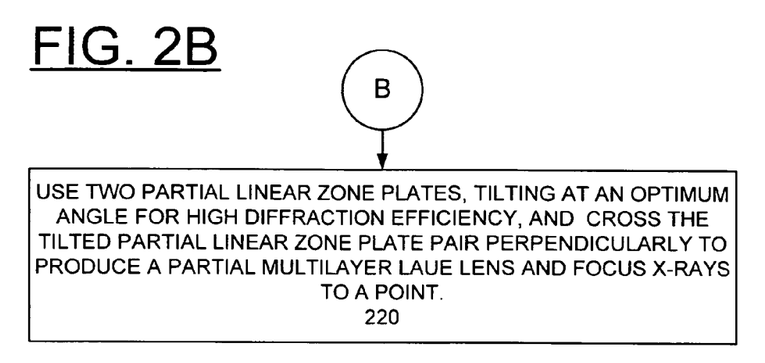

As indicated in a block 220 in FIG. 2B, two partial multilayer linear zone plate sections are assembled in series and crossed perpendicularly to form a partial Multilayer Laue Lens to focus x-rays to a point; each partial multilayer linear zone plate section is tilted at an optimum angle for high diffraction efficiency. For example, highest efficiency is achieved with the layers in the multilayer sections are tilted towards a certain Bragg angle of diffraction in the multilayer (typically ~0.1 degree according to our experiments). As illustrated in FIG. 1, each multilayer section 102 produces a line focus, and two identical sections advantageously are combined to give a higher numerical aperture (higher reception of x-rays) and higher spatial resolution. Since only one section is used to produce a line focus in the partial Multilayer Laue Lens configuration, the optimum spatial resolution and efficiency are not utilized. However, the mechanical design for holding and aligning the sections are greatly simplified.

Figure 2C:
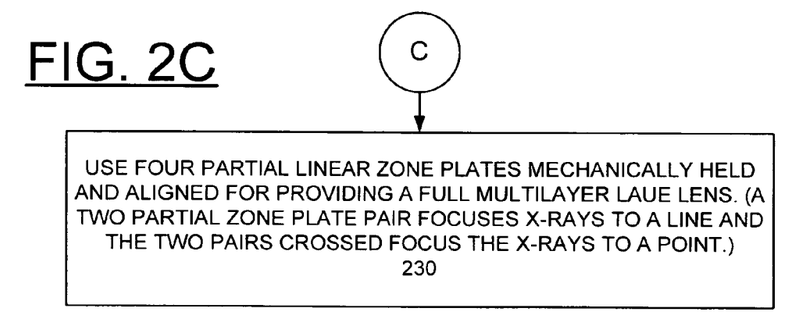

As indicated in a block 230 in FIG. 2C, four partial multilayer linear zone plate sections are assembled to form a full Multilayer Laue Lens to focus x-rays to a point; sophisticated mechanical design is needed to hold and align the partial linear zone plates with two of them forming a pair to focus the x-rays to a line and another pair crossed to focus the x-rays to a point.

Figure 2D:
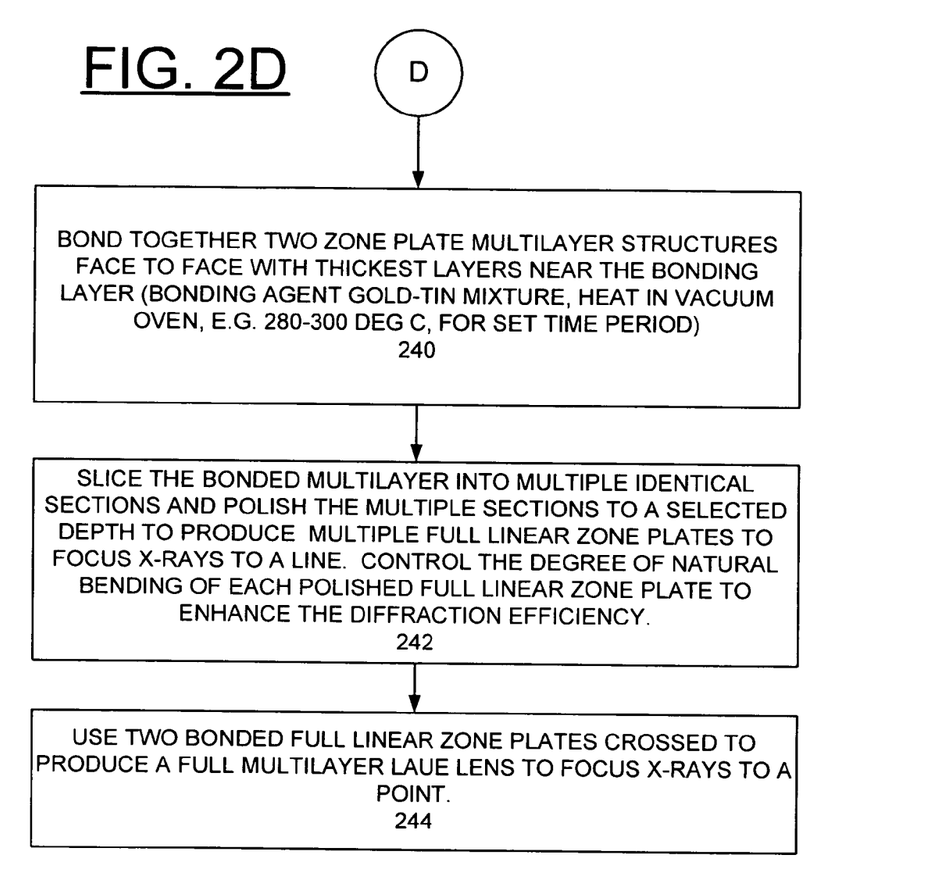

As indicated in a block 240 in FIG. 2D, two zone-plate multilayer structures are bonded together face to face with the thickest layers near the bonding layer, with for example a gold-tin mixture used for a bonding agent, and heating in a vacuum oven at a selected temperature for a set time period. For example, the selected temperature is provided in a range between 280 and 300 degrees C. Then as indicated in a block 242, the bonded multilayer structures are sliced into multiple identical sections and polished to a selected depth to produce multiple full linear zone plates to focus x-rays to a line. Due to the thinness of the polished sections (in the order of 5-25 μm), the polished piece naturally bends slightly to one side.

By selecting the favorable side to face the x-rays, the diffraction efficiency can be enhanced. By controlling the length-to-width ratio of the sliced pieces, the bending degrees of the polished pieces are controlled with the right curvatures selected to enhance the diffraction efficiency of the linear zone plate.

As indicated in a block 244, two bonded full linear zone plates are aligned perpendicularly to produce a full Multilayer Laue Lens to focus x-rays to a point.

Experimental Results

Two multilayer systems have been investigated: $WSi_2/Si$ and W/Si on Si substrates. All depositions reported here were carried out at the Advanced Photon Source deposition laboratory at Argonne National Laboratory using DC magnetron sputtering. Multiple substrates can be loaded at different locations on a 60-inch-long substrate holder, with no detectable difference because of the location and a lateral uniformity within 1% across a 100-mm width for thin films. All targets were 3 inches in diameter and 0.25 inch thick. The Si target was 99.999% boron-doped, and the $WSi_2$ target was 99.5% powder-hot-pressed with a density of 8.04 to 8.08 g/cc. The substrates were loaded on a carrier with the optical surface facing down and were alternately translated back and forth over two 3-in.-diam planar sputter guns during deposition. The substrate-to-target distance was 107 mm with no bias applied to the substrates. Laterally uniform depositions were achieved through the design of shaped apertures above the sputter guns. The sputter guns were operated at a constant current of 0.5 A, and the film thicknesses were controlled by the translation speeds and the number of loops over the gun according to growth-rate calibrations. The guns were programmed to turn on 7 seconds before the substrate was moved over and to turn off after a desired thickness was deposited. This procedure reduces the use of the target material, lowers the target temperature, and helps ensure comparable growth conditions for each sequential layer growth. We measured the composition of our sputtered $WSi_2$ films using energy dispersive x-ray (EDX) analyses. The typical ratio of Si to W was $1.874 \pm 0.118$.

The sputter guns and depositions advantageously are automated. The voltage, current, and power readings of the sputter power supplies advantageously are logged into a computer during deposition for monitoring purposes. Zone-plate multilayers are grown according to the Fresnel zone formula, precalibrated growth rates, and predetermined growth-rate-drift corrections. Growth rate tests advantageously are performed on targets at different states of usage using both constant current and constant power modes. Periodic test samples are analyzed using x-ray reflectance measurements with an optical modeling software, and zone-plate multilayers were studied by SEM image analyses.

To satisfy the zone-position requirement of Eq. (1), the thickness of each layer must be precisely controlled. We need to understand the growth rate for each multilayer component and how the growth rate changes during the growth of each layer and over the course of the multilayer deposition. For these purposes, periodic multilayer test samples were grown using different procedures and measured using x-ray reflectance. The analysis of the reflectivity was done with the aid of IMD, a computer program for modeling the optical properties of multilayers. Reflectivity measurements were made in $\theta$-$2\theta$ geometry over the range from $0 < \theta < 6°$, using Cu K$\alpha_1$ x-rays with a collimating multilayer optic followed by a Ge crystal monochromator. The measured data were compared with that calculated using the IMD software for a best fit to determine layer thicknesses and interface parameters.

The following procedure was designed to understand the multilayer growth and to calibrate the growth rates. Two $12.5 \times 25 \times 0.5$ mm$^3$ Si test substrates (cut from an ordinary wafer) were loaded on the substrate holder ~40 cm apart. Two different $[WSi_2/Si] \times 15$ multilayers were grown on these substrates with certain fixed moving speeds when they were passing the sputter guns. For substrate A, three loops over the $WSi_2$ gun and two loops over the Si gun were used to complete a bilayer. For substrate B, two loops over the $WSi_2$ gun and three loops over the Si gun were used to complete a bilayer. The fitted thickness for Si was 50.28 Å for sample A and 75.42 Å for sample B, and for $WSi_2$ was 36.12 Å for A and 24.08 Å for B. The results indicate that the thicknesses of both $WSi_2$ and Si scale linearly with the number of loops over the target. The same procedure was later used to study W/Si multilayers, with W replacing $WSi_2$ and with different fixed speeds. This time the Si thickness was 20.58 Å for sample A and 37.85 Å for sample B, and the W thickness was 52.92 Å for A and 35.65 Å for B. The thicknesses for W and Si do not scale linearly with the number of loops. In other words, the traditional scaling method using the deposition time for thickness control cannot be applied to the W/Si multilayer system but can be used in the $WSi_2$/Si system. One possible explanation is that Si is very reactive with W, and a portion of the deposited Si and incoming Si atoms might have diffused into W for the W/Si multilayer system during deposition and cannot be accounted for in the simulation. For the $WSi_2$/Si system, this effect is negligible, since $WSi_2$ is already a silicide.

The desired total thickness of the multilayer for the zone-plate application is quite large, at least a few microns for each multilayer material. The growth rate may change from the beginning to the end of deposition. How the rate changes with the target use has to be measured and incorporated in the calculation of the growth of each zone layer. To demonstrate the change of the growth rate with the target use, three Si targets with different target erosion levels were selected for three sets of $WSi_2/Si \times 15$ and $W/Si \times 15$ multilayers under identical growth conditions and the same substrate translation speeds. Only the number of loops over the Si gun was changed: one for sample A, two for B, and three for C. A total of 18 samples were grown and measured with x-rays and analyzed with the IMD software. Three $12.5 \times 25 \times 0.5$ mm$^3$ Si substrates were loaded at one time, ~40 cm apart, for one set of multilayer growth. FIG. 2 summarizes the results of the Si layer thickness as a function of Si deposition time. The $WSi_2$ (and W) layer thicknesses were very close in value for each set of samples. The three Si targets are: "new"—barely used, "middle"—with an erosion depth of ~4.8 mm, and "old"—with an erosion depth of ~6.1 mm. The targets were all 3 inches in diameter and 0.25 inch in thickness.

Figure 3:
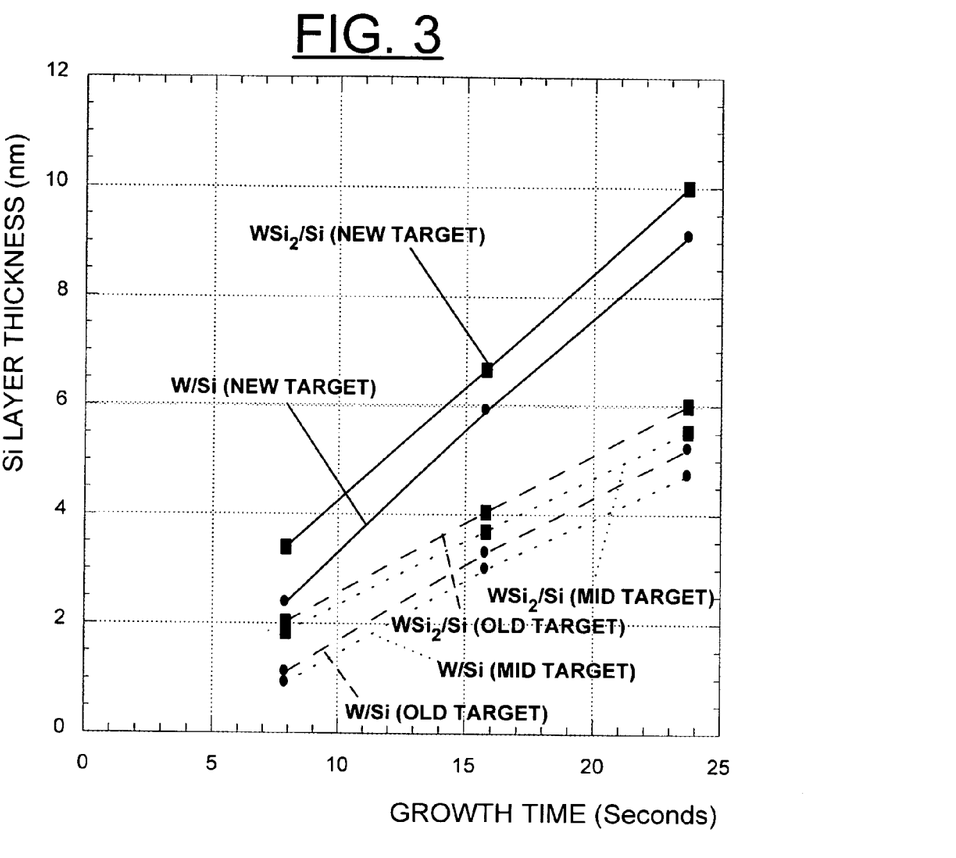
FIG. 3 illustrates Si layer thickness as a function of growth time for six sets of $WSi_2$/Si (squares) and W/Si (dots) multilayers, where thickness data were obtained from x-ray reflectivity analyses and the multilayers were grown under identical growth conditions; and note that for W/Si the straight lines do not extrapolate to zero at zero growth time while for $WSi_2$/Si the straight lines do; also note that the growth rate decreases as the target is consumed.

Referring now to FIG. 3, one can see that the growth rate decreases with target use, with the decrease most rapid when the target is new. We thus use only targets that have been moderately used for zone-plate multilayer growth. Also one can clearly see that the Si layer thickness does not extrapolate to zero at zero growth time for W/Si, in contrast to the case for $WSi_2$/Si. The nonlinearity of layer thicknesses with deposition time has been previously reported for the W/Si multilayer system using x-ray reflectance analyses and the IMD software. Interfacial diffusion, mixing due to energetic bombardment, and resputtering were attributed as possible causes for the nonlinearity. Our studies support the case for interdiffusion, since the $WSi_2$/Si system obeys a linear scaling. It is well known that multilayers consisting of chemically reacting materials (such as W/Si and Mo/Si) suffer more diffusive mixing and are less stable than multilayers consisting of nonreacting materials (such as $WSi_2/Si$ and $MoSi_2/Si$). The diffusive mixing in these multilayers is a dominant factor in interfacial imperfection. In our pursuit of small-d-spacing multilayers for narrow-bandpass monochromator applications, we have found that $WSi_2/Si$ multilayers have sharper interfaces than W/Si multilayers. Because of its linear growth-rate behavior and sharp interfaces, $WSi_2/Si$ is an ideal multilayer system for linear zone-plate applications. An added advantage for the $WSi_2/Si$ system is the relatively high growth rate. Under the same growth conditions, Si grows approximately eight times faster than other traditional low-Z materials such as C or $B_4C$. A high growth rate is critical for thick zone-plate growth.

By using periodic multilayer and x-ray analyses, one can thus determine the initial growth rate and the growth-rate drift with the growth time for the $WSi_2/Si$ system. In the following, we discuss how to grow a linear zone-plate multilayer structure.

The Growth of Linear Zone-Plate Multilayers

A linear zone-plate structure is defined by Eq. (1), with $r_n$ defined as the distance between the outer edge of the nth zone and the optical axis. One may choose an outermost zone width and calculate the zone-plate structure according to the intended x-ray energy range and focal length. For our test sample, we have chosen an outermost zone of 15 nm, $\lambda=0.413$ Å (30 keV), and f=10.89 mm. One may use the same zone plate at different energies by adjusting the focal length. For fixed $\lambda$ and f, the maximum number of zones is determined by the width of the outermost zone $\Delta r_{out}$ according to $$n_{max} \approx f\lambda/4(\Delta r_{out})^2. \quad (2)$$

Equation (2) is easily derived from Eq. (1) by taking a derivative of $r_n$ and using the condition of $\lambda<<f$. From Eq. (2), we have $n_{max}$ of 500 for our test zone plate with $r_{500} \approx 15$ µm. Then from Eq. (1) and $(r_n-r_{n-1})$, the layer thickness of each zone was obtained. Zone 500 with a width of $(r_{500}-r_{499}) \approx 15$ nm is the outermost zone (layer 1). The corresponding zone plate structure thus has a 30 µm diameter and a 15 nm outmost zone width. It is not necessary to fabricate the full zone structure to produce a focusing optic; the diffraction-limited resolution of a partial zone-plate structure simply varies inversely with the size of the partial structure. We chose to fabricate the zone structure from zone 31 to zone 500, for a total of 470 layers and a total deposition thickness of $r_{500}-r_{30}=11.33$ µm. Zone 31 has a width of $(r_{31}-r_{30}) \approx 60$ nm and is the last-coated layer (Layer 470).

When the outermost zone is thin, the difference between neighboring outer zones becomes very small. In our test zone-plate structure, the thickness difference between the first and second $WSi_2$ layer (zone 500 and zone 498) is only 0.3 Å. To produce an ideal zone plate, the layer positions in the structure must be controlled to within a small fraction of the layer width. This means that the accumulated thickness error over hundreds of layers totaling ~10 µm thickness should be less than a few nanometers. The resolution of the substrate speed control should therefore be significantly smaller than $1 \times 10^{-4}$ so that it does not contribute significantly to the accumulated error. A microstepping motor with built-in indexing, manufactured by Compumotor, drives the transport in our deposition system. The indexer can resolve velocities to the fifth decimal place, while the speed we use is in the first decimal place. Growth-rate tests were used to determine the initial speeds for a 1 nm deposition per loop for each material. The required thickness for each zone layer in units of nanometers determines how many loops to use, and the remainder is distributed equally into each loop with a calculated difference in speed. A computer program was developed to calculate the thickness of each layer from Eq. (1) and the time needed for its growth, taking into account the decrease in growth rate during multilayer deposition. The decrease of growth rate over the whole deposition duration was determined according to a series of studies on uniform test multilayers as a function of the target usage. The predetermined growth rate change was used for the growth correction for the $WSi_2/Si$ multilayer, apportioned according to the accumulated "target on" time. This computer program compiles a command script to be executed by the system control program.

Using this control system, the zone-plate multilayer structure was grown in 2.3 mTorr Ar onto five $12.5 \times 25 \times 0.5$ mm³ Si substrates. The coating was carried out automatically and took ~32 h to complete for the 11.33 µm $WSi_2/Si$ multilayer. The same zone-plate multilayer structure was also grown using W/Si with a total growth time of ~45 h. We noticed that the targets used in growing the W/Si multilayer were "older," which might contribute to the substantially longer growth time as well. The W/Si zone-plate multilayer cracked and peeled from the substrate on the edges of the multilayer. $WSi_2/Si$ multilayers with the same thickness and multilayer structure remained intact and survived subsequent slicing and polishing.

During the growth of the 11.33 µm $WSi_2/Si$ multilayer we noticed quite a few fallen flakes on the bottom of the Si deposition chamber. For $WSi_2$, the situation was much better; $WSi_2$ has better adhesion to the inner walls of the shield can. Since then we have used aluminum foil to cover the inside of the shield can, especially the upper part directly facing the gun. We noticed improved stability of the sputter guns and no more fallen Si flakes during subsequent zone-plate multilayer growths.

Characterization of Linear Zone-Plate Multilayer

The face of the $WSi_2/Si$ zone-plate multilayer was glued to another Si substrate and sectioned to ~1×2 mm² pieces using a diamond dicing saw. A scanning electron microscope (SEM) image of the polished cross section of the multilayer shows flat and sharp interfaces of the multilayer. A gradual increase in d spacing is clearly evident for all $WSi_2/Si$ multilayers we studied.

SEM images of the multilayer cross section were analyzed to determine the positions of every layer in the multilayer. According to Eq. (1), a plot of the inverse of the layer spacing $1/\Delta r_n$ versus layer position $r_n$ should be a straight line (for $\lambda<<f$) with a slope equal to $-2/\lambda f$. A plot of the inverse of d spacing $1/d(r_n)$ versus layer position $r_n$ is also a straight line with a slope equal to $-1/\lambda f$.

Figure 4:
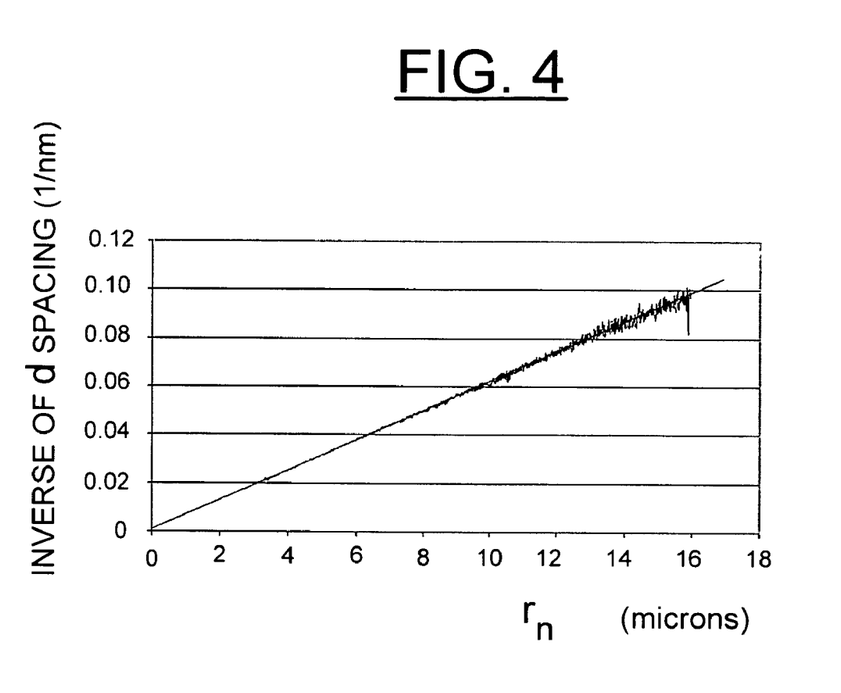
FIG. 4 illustrates measured inverse d spacing versus layer position from a SEM image for a $WSi_2$/Si zone-plate multilayer together with a linear fit of the data; and note the excellent fit of the data.

Referring to FIG. 4, there is shown measured inverse of d spacing $1/d(r_n)$ versus layer position $r_n$ from SEM images for a zone-plate multilayer with 5 nm outermost zone width and 1558 layers, together with a linear fit of the data. The measured data fit beautifully with a straight line, indicating an almost perfect zone plate structure. This zone plate structure has produced a 17-nm line focus for 19.5-keV x-rays.

Bonding of Zone-Plate Multilayer Structures

As revealed in this invention, a metallic bonding technique is used to bond two multilayer structures together, face to face, with a precise AuSn layer. The AuSn layer is sputter-coated onto the surfaces of both multilayer structures with a thickness calculated from the SEM image analyses of the multilayer. The thickness of AuSn is precisely controlled so that the layers in the zone-plate multilayer still follow the zone plate law. Then the AuSn-coated multilayer structures are clamped together, face to face, and heated in a vacuum oven at a selected temperature for a set time period. For example, the selected temperature is provided in a range between 280 and 300 degrees C.

Experiments have been carried out to demonstrate that the multilayer structure does not change after bonding. Periodic test multilayers were heated up to ~350 degrees C. and x-ray reflectivity measurements were compared before and after heating. Our results demonstrated that no change was observed after heating.

A bonded test zone-plate multilayer was sectioned and polished and measured with SEM. The test zone-plate multilayer has an outermost zone width of 12.4 nm and a total multilayer thickness of 13.13 μm. The plot of inverse of d spacing $1/d(r_n)$ versus layer position $r_n$ shows that the data in the thinner region of 8.4 μm fit to a straight line and the rest of data in the thicker region deviate from the straight line.

Figure 5:
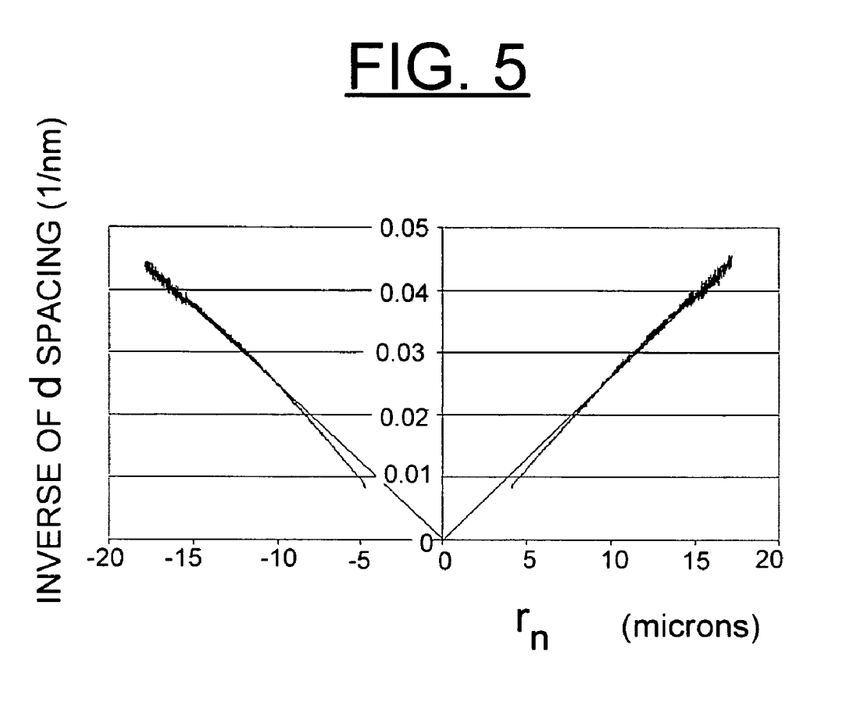
FIG. 5 illustrates measured inverse d spacing versus layer position from a SEM image for a test AuSn-bonded $WSi_2$/Si zone-plate multilayer together with linear fits of the data over the ±8.88 to ±17.28 μm region; and note that the straight lines extrapolate to the zero position.

FIG. 5 shows the inverse of d spacing $1/d(r_n)$ versus layer position $r_n$ of the bonded test zone-plate multilayer as measured from SEM images together with linear fits of the data over the ±8.88 to ±17.28 μm region. The two straight lines extrapolate to the zero position, indicating that a precise bonding layer has been achieved.

The bonded test zone-plate multilayer was sliced and polished to as thin as 5 μm without cracking, indicating that the bonding is very strong.

A slight natural bending of the thin polished bonded test zone-plate multilayer was observed. This natural bending can be used advantageously in bonded full linear zone plate to enhance the diffraction efficiency. By controlling the length-to-width ratio of the sliced pieces, the bending degrees of the polished pieces can be modified to suit the specific applications.

In brief summary, the feasibility of using planar depth-graded multilayers in fabricating high-aspect-ratio linear zone plates for hard x-ray focusing applications has been demonstrated. $WSi_2$/Si is the preferred candidate for growing such multilayers with the required layer-position accuracy. Detailed studies of uniform W/Si and $WSi_2$/Si multilayers demonstrated that $WSi_2$/Si multilayers have more predictable growth rates and sharper interfaces than W/Si ones. $WSi_2$/Si multilayers with layer spacings following the Fresnel zone-plate formula for an outermost zone width of 5 nm have been successfully grown. The analysis of SEM images verified that an almost perfect zone-plate structure was obtained over the entire region of the deposition, which produced very promising line focusing performance of 17 nm for 19.5 KeV x-rays. The feasibility of bonding two zone-plate multilayer structures to produce full linear zone plates has also been demonstrated. Either partial Multilayer Laue Lenses or bonded full Multilayer Laue Lenses can be produced. With a sophisticated mechanical design to hold and align the partial linear zone plates, a full Multilayer Laue Lens without bonding may also be produced.

While the present invention has been described with reference to the details of the embodiments of the invention shown in the drawing, these details are not intended to limit the scope of the invention as claimed in the appended claims.

What is claimed is:

1. A method of making a Multilayer Laue Lens (MLL) zone plate for focusing hard x-rays comprising the steps of:
providing a substrate; said substrate being a flat polished substrate;
sequentially depositing on said substrate a plurality of alternating layers respectively formed of tungsten silicide ($WSi_2$) and silicon (Si) and precisely controlling a thickness of each layer from a minimum thickness of a first deposited layer adjacent the substrate to a maximum thickness of a last deposited layer to form a zone plate multilayer structure;
said first minimum thickness layer having a selected thickness of less than or equal to 5 nm with monotonically increasing thickness of said alternating layers to provide said multilayer structure having a thickness of greater than 12 μm (microns); and x-rays passing through said silicon layers and being diffracted by said tungsten silicide layers; and
bonding together a pair of said zone plate multilayer structures using a gold-tin mixture as a bonding agent with said maximum thickness layer near the bond layer to produce a bonded multilayer.

2. A method of making a Multilayer Laue Lens (MLL) zone plate as recited in claim 1 further includes slicing said zone plate multilayer structure to form a plurality of multilayer sections; and polishing said multilayer sections to a selected depth to produce multiple partial zone plates.

3. A method of making a Multilayer Laue Lens (MLL) zone plate as recited in claim 2 includes using two of said multiple partial zone plates tilted at a predefined angle for high diffraction efficiency and crossed perpendicularly to produce a partial Multilayer Laue Lens (MLL) to focus x-rays to a point.

4. A method of making a Multilayer Laue Lens (MLL) zone plate as recited in claim 3 wherein said multiple partial zone plates are tilted toward a Bragg angle of diffraction to achieve highest efficiency.

5. A method of making a Multilayer Laue Lens (MLL) zone plate as recited in claim 2 includes using four of said multiple partial zone plates being mechanically held and aligned for providing a full Multilayer Laue Lens (MLL), wherein two pairs of said four multiple partial zone plates focuses x-rays to a line and said two pairs are crossed to focus the x-rays to a point.

6. A method of making a Multilayer Laue Lens (MLL) zone plate as recited in claim 1 includes slicing said bonded multilayer to form a plurality of sections; and polishing said sections to a selected depth to produce multiple full linear zone plates.

7. A method of making a Multilayer Laue Lens (MLL) zone plate as recited in claim 6 wherein slicing said sections includes providing a selected length-to-width ratio to modify the natural bending of each said polished full linear zone plate to enhance diffraction efficiency.

8. A method of making a Multilayer Laue Lens (MLL) zone plate as recited in claim 1 wherein bonding together said pair of said zone plate multilayer structures includes heating in a vacuum oven at a selected temperature for a set time period.

9. A method of making a Multilayer Laue Lens (MLL) zone plate as recited in claim 8 wherein said selected temperature is provided in a range between 280 and 300 degrees C.

10. A method of making a Multilayer Laue Lens (MLL) zone plate as recited in claim 1 wherein sequentially depositing on said substrate said plurality of alternating layers includes using direct current (DC) magnetron sputter deposition to form the plurality of alternating layers.

11. A zone plate multilayer structure for a Multilayer Laue Lens (MLL) for focusing hard x-rays comprising:
a flat polished substrate carrying a plurality of deposited alternating layers respectively formed of tungsten silicide ($WSi_2$) and silicon (Si);
each of said deposited alternating layers having a precisely controlled thickness from a minimum thickness of a first deposited layer adjacent the substrate to a maximum thickness of a last deposited layer to form the zone plate multilayer structure;

said first minimum thickness layer having a selected thickness of less than or equal to 5 nm with monotonically increasing thickness of said alternating layers to provide said multilayer structure having a thickness of greater than 12 μm (microns); and x-rays passing through said silicon layers and being diffracted by said tungsten silicide layers; and a pair of said zone plate multilayer structures being bonded together using a gold-tin mixture as a bonding agent with said maximum thickness layer near the bond layer to produce a bonded multilayer.

12. A zone plate multilayer structure for a Multilayer Laue Lens (MLL) for focusing hard x-rays as recited in claim 11 wherein said zone plate multilayer structure is sliced and polished to form multiple partial zone plates.

13. A zone plate multilayer structure for a Multilayer Laue Lens (MLL) for focusing hard x-rays as recited in claim 12 wherein two of said multiple partial zone plates are tilted at a predefined angle for high diffraction efficiency and crossed perpendicularly to produce a partial Multilayer Laue Lens (MLL) to focus x-rays to a point.

14. A zone plate multilayer structure for a Multilayer Laue Lens (MLL) for focusing hard x-rays as recited in claim 12 wherein four of said multiple partial zone plates are mechanically held and aligned for providing a full Multilayer Laue Lens (MLL), wherein two pairs of said four multiple partial zone plates focuses x-rays to a line and said two pairs are crossed to focus the x-rays to a point.

15. A zone plate multilayer structure for a Multilayer Laue Lens (MLL) for focusing hard x-rays as recited in claim 11 wherein said bonded multilayer is sliced to form a plurality of sections; and said sections are polished to a selected depth to produce multiple full linear zone plates.

16. A zone plate multilayer structure for a Multilayer Laue Lens (MLL) for focusing hard x-rays as recited in claim 15 wherein slicing said sections includes providing a selected length-to-width ratio to modify the natural bending of each said polished full linear zone plate to enhance diffraction efficiency.

17. A zone plate multilayer structure for a Multilayer Laue Lens (MLL) for focusing hard x-rays as recited in claim 11 wherein said maximum thickness of said plurality of alternating layers is selected in a range of approximately 25 nm to 58 nm.

* * * * *